United States Patent
Ågren et al.

Patent Number: 5,148,837
Date of Patent: Sep. 22, 1992

[54] PIPE FOR RELINING UNDERGROUND PIPELINES

[75] Inventors: Lennart Ågren, Borås; Eino Hölsö, Viskafors, both of Sweden

[73] Assignee: Uponor N.V., Netherlands Antilles

[21] Appl. No.: 634,871

[22] PCT Filed: May 25, 1989

[86] PCT No.: PCT/SE89/00294
§ 371 Date: Jan. 8, 1991
§ 102(e) Date: Jan. 8, 1991

[87] PCT Pub. No.: WO89/12198
PCT Pub. Date: Dec. 14, 1989

[30] Foreign Application Priority Data
May 31, 1990 [SE] Sweden .................. 8802005

[51] Int. Cl.⁵ .................................. F16L 11/12
[52] U.S. Cl. ......................... 138/121; 138/122; 138/98; 138/137
[58] Field of Search .............. 38/121, 122, 129, 137, 38/173, 177, 178, 97, 98, 103; 405/150, 154; 264/269

[56] References Cited

U.S. PATENT DOCUMENTS

| | | | |
|---|---|---|---|
| 2,898,941 | 8/1959 | Kilcup | 138/121 |
| 3,330,303 | 7/1967 | Fochler | 138/121 |
| 3,550,639 | 12/1970 | Okuda | 138/121 |
| 3,640,312 | 2/1972 | Bauman et al. | 138/121 |
| 3,797,530 | 3/1974 | Ambrose et al. | 138/137 |
| 3,837,364 | 9/1974 | Jenner | 138/122 |
| 4,037,626 | 7/1977 | Roberts | 138/121 |
| 4,312,383 | 1/1982 | Kleykamp | 138/121 |
| 4,373,554 | 2/1983 | Cook | 138/98 |
| 4,410,391 | 10/1983 | Thomas et al. | 138/97 |
| 4,421,437 | 12/1983 | Langner | 138/122 |
| 4,496,499 | 1/1985 | Brittain et al. | 138/98 |
| 4,620,569 | 11/1986 | von Glanstatten et al. | 138/121 |
| 4,754,781 | 7/1988 | de Putter | 138/121 |
| 4,957,792 | 9/1990 | Shizuo et al. | 138/122 |

FOREIGN PATENT DOCUMENTS

| | | |
|---|---|---|
| 0189145 | 7/1986 | European Pat. Off. . |
| 0213674 | 7/1988 | European Pat. Off. . |
| 2912840 | 10/1979 | Fed. Rep. of Germany . |
| 3132435 | 2/1983 | Fed. Rep. of Germany . |
| 87/05376 | 9/1987 | World Int. Prop. O. . |

Primary Examiner—James E. Bryant, III
Attorney, Agent, or Firm—Merchant, Gould, Smith, Edell, Welter & Schmidt

[57] ABSTRACT

Pipe for relining underground pipelines, which is of the composite type having an annularly rigid corrugated outside wall (10) of polymer material, which is connected to the outside surface of a smooth inside wall (11) which consists of a thermoplastic elastomer so that it can be stretched and compressed. According to the invention there is provided on the inside of the smooth inside wall (11) a thin layer (13) of the thermoplastic having a lower frictional coefficient and/or greater wear-resistance than the material of the inside wall.

4 Claims, 1 Drawing Sheet

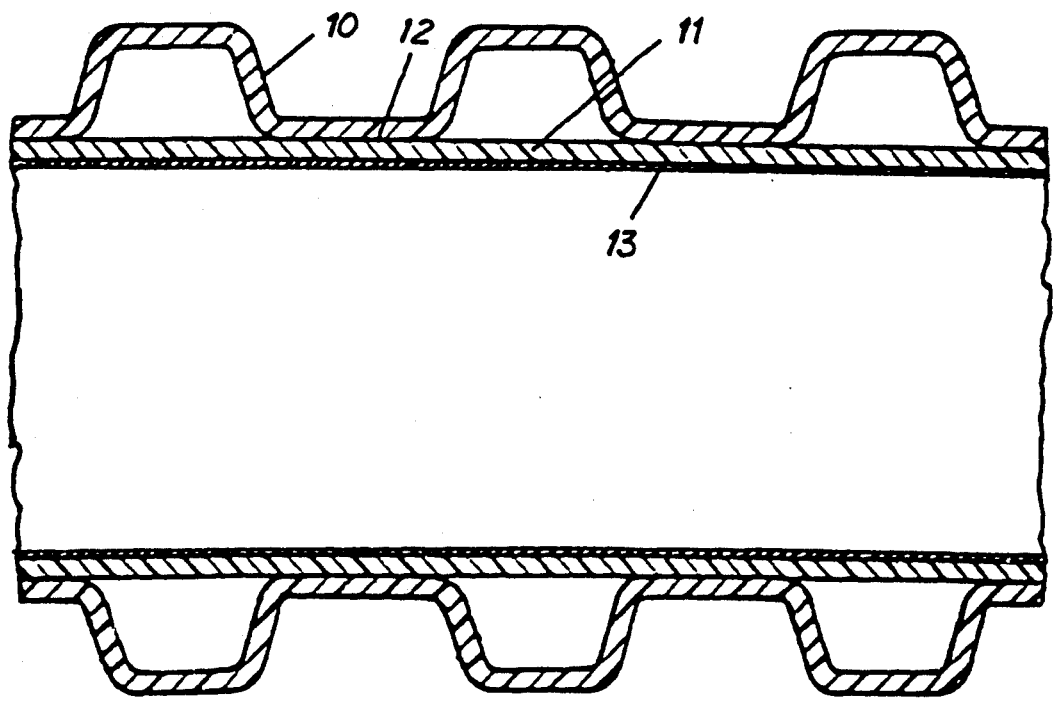

PIPE FOR RELINING UNDERGROUND PIPELINES

BACKGROUND OF THE INVENTION

The invention relates to a pipe for relining underground pipelines, which is of the composite type with an annularly rigid corrugated outside wall of polymer material, which is attached to the outside surface of a smooth inside wall, which consists of a thermoplastic elastomer so that it can be stretched and compressed.

Pipes of this type are described in the European patent application with publication number 0 213 674.

When an underground pipeline is to be relined by using pipes of this type the pipe is drawn from ground level through a well or manhole into the pipeline, and due to the fact that the inside wall consists of a thermoplastic elastomer the pipe then can be abruptly angled—at an angle of 90° if necessary—when it passes from the well or the manhole into the pipeline, and the pipe can adjust to existing constrictions and direction changes in the underground pipeline more easily than in case of a rigid inside wall. In order to use such relining pipes having a rigid inside wall it is usually necessary to take up wide manholes which allow the pipe to be drawn from ground level into the underground pipeline via the manhole along a rather flat trajectory.

Pipes of the type referred to herein are not without problems, however, in other respects than those relating to the procedure of drawing the pipe into the underground pipeline. In the first place problems arise in the manufacture of the pipe. The pipe is manufactured by coextruding the inside wall and the outside wall, said latter wall at the same time in connection with the extrusion being corrugated by forming and cooling the wall against chains of chilled molds and the smooth inside wall being calibrated and cooled by sliding over a cooling mandrel. The problem involved in the technique of manufacturing the pipe is that the inside wall of a thermoplastic elastomer tends to stick to the cooling mandrel involving the risk of the wall being torn to rags. In the second place there is a problem with respect to the wear resistance of the smooth inside wall of thermoplastic elastomer. This wall must be made substantially thinner than the wall of corresponding smooth, rigid polyethylene or PVC pipes for waste conduits in order that it can be stretched and compressed as is necessary at abrupt direction changes when the pipe is drawn into the underground pipeline, which means that the wear resistance will be a critical factor in this connection. At the same time it can be questioned if a wall of a thermoplastic elastomer can be on a level with a wall of polyethylene or PVC as far as the long term wear resistance is concerned.

SUMMARY OF THE INVENTION

The present invention provides a possibility to meet these problems, viz. by the relining pipe of the type referred to herein being constructed in the manner defined in the characterizing clause of claim 1.

BRIEF DESCRIPTION OF THE DRAWING

In order to explain the invention in more detail reference is made to the accompanying drawing which discloses a fragmentary axial cross-sectional view of a relining pipe according to the invention in one embodiment thereof.

DETAILED DESCRIPTION OF THE PREFERRED EMBODIMENT

The pipe shown in the drawing is of a prior art embodiment as far as it comprises a corrugated outside wall 10 and an inside wall 11 which is smooth on the inside as well as the outside thereof, the inside peaks of the outside wall being connected to the smooth outside of the inside wall at 12. The pipe preferably is manufactured by coextruding the outside and the inside walls, the outside wall being corrugated in connection with the extrusion by being formed and cooled against chains of chilled molds. The inside wall is calibrated and cooled in connection with the extrusion by means of a cooled inside mandrel. Suitable materials for the outside wall are polyethylene, polypropylene, and PVC, while suitable materials for the inside wall are e.g. EPDM mixed with polyethylene (synthetic rubber), thermoplastic olefines, e.g. VISTAFLEX (registered trademark), SANTOPRENE (registered trademark), and ALCRYN (registered trademark), ethylenevinylacetate polymers, e.g. ESCORENE (registered trademark), and mixtures of styrene, ethylene, and butane, e.g. ELEXAR (registered trademark).

On the inside surface of the inside pipe 11 a thin layer 13 of thermoplastic, e.g. polyethylene, crosslinked polyethylene or PVC, is provided, the purpose of which is to form an antifriction layer between the mandrel and the thermoplastic elastomer and to provide improved wear-resistance of the inside pipe. If the inside wall consists of a thermoplastic elastomer which is compatible with an outside wall of polyethylene or polypropylene, then polyethylene is chosen when priority is given to the reduction of the friction, and crosslinked polyethylene is chosen when priority is given to the wear-resistance. PVC is used in the layer 13 in case the inside wall consists of a thermoplastic elastomer which is compatible with an outside wall of PVC, e.g. ALCRYN (registered trademark). The layer 13 can have a thickness of 0.05 to 0.30 mm on an inside wall of a thermoplastic elastomer which has a thickness of about 1 mm in case of a pipe having an outside diameter of about 200 mm. More generally the thickness of the layer 13 should measure 2-30% of the total thickness of the inside pipe 11 and the layer 13. Crosslinked polyethylene preferably is of the silan crosslinked type which can crosslink automatically under the influence of humidity after the manufacturing step proper.

A further advantage of the pipe described is that the layer 13 can be used for providing a colour code which makes possible to distinguish a normal double-wall pipe (wherein the outside wall as well as the inside wall is rigid) from a double-wall pipe having an inside wall of thermoplastic elastomer. It is important to be able to distinguish easily between these two types of pipes in handling material (handling scrap) in the factory.

We claim:

1. A composite pipe for relining underground pipelines, comprising:
    an annular rigid corrugated outside wall (10) of polymer material having an inner and outer surface;
    an inside wall (11) composed of a thermoplastic elastomer which can be stretched and compressed, the inside wall having a substantially smooth inner surface and outer surface (12), the smoother outer (12) being connected to the inner surface of the outside wall (10); and a thin wear protective, anti-friction layer (13) of polyethylene formed integrally on the inner surface of the inside wall (11) which increases durability and facilitates the manufacture of the composite pipe.

2. The composite pipe of claim 1 wherein the thin wear protective layer (13) consists of cross-linked polyethylene.

3. The composite pipe of claim 2 where the thin wear protective layer (13) consists of silan cross-linked polyethylene.

4. The composite pipe of claim 1 wherein the thickness of the thin wear protective layer (13) is between 2 to 30 percent of the combined thickness of the inside wall (11) and the wear protective layer (13).

* * * * *